(12) United States Patent
Ruggeri et al.

(10) Patent No.: US 8,905,407 B2
(45) Date of Patent: Dec. 9, 2014

(54) SEGMENTED SEAL WITH AXIAL LOAD CONTROL FEATURE

(75) Inventors: Edward N. Ruggeri, Westport, MA (US); Gerald M. Berard, North Providence, RI (US)

(73) Assignee: Eaton Corporation, Cleveland, OH (US)

( * ) Notice: Subject to any disclaimer, the term of this patent is extended or adjusted under 35 U.S.C. 154(b) by 720 days.

(21) Appl. No.: 13/038,798

(22) Filed: Mar. 2, 2011

(65) Prior Publication Data

US 2012/0223490 A1 Sep. 6, 2012

(51) Int. Cl.
F16J 15/34 (2006.01)
F16J 15/00 (2006.01)
F16J 15/16 (2006.01)
F16J 15/44 (2006.01)

(52) U.S. Cl.
CPC .................................. F16J 15/442 (2013.01)
USPC ........... 277/400; 277/399; 277/401; 277/416; 277/422; 277/543; 277/544

(58) Field of Classification Search
USPC .................. 277/416, 422, 399–401, 543–547
See application file for complete search history.

(56) References Cited

U.S. PATENT DOCUMENTS

| | | | | |
|---|---|---|---|---|
| 770,895 A * | 9/1904 | Elliott et al. | | 49/110 |
| 1,999,094 A * | 4/1935 | Godron | | 277/544 |
| 3,575,424 A * | 4/1971 | Taschenberg | | 277/411 |
| 4,082,296 A * | 4/1978 | Stein | | 277/400 |
| 4,211,424 A * | 7/1980 | Stein | | 277/352 |
| 4,943,069 A * | 7/1990 | Jinnouchi | | 277/543 |
| 4,971,306 A * | 11/1990 | Jinnouchi et al. | | 277/544 |
| 5,100,158 A * | 3/1992 | Gardner | | 277/411 |
| 5,169,159 A * | 12/1992 | Pope et al. | | 277/422 |
| 5,509,664 A * | 4/1996 | Borkiewicz | | 277/543 |
| 5,516,118 A * | 5/1996 | Jones | | 277/400 |
| 5,558,341 A * | 9/1996 | McNickle et al. | | 277/400 |
| 6,145,843 A * | 11/2000 | Hwang | | 277/400 |
| 6,572,113 B2 * | 6/2003 | Care | | 277/410 |
| 6,637,753 B2 * | 10/2003 | Mohammed-Fakir et al. | | 277/416 |
| 6,692,006 B2 * | 2/2004 | Holder | | 277/346 |
| 7,770,895 B2 * | 8/2010 | Zheng et al. | | 277/416 |
| 7,914,007 B2 * | 3/2011 | Berard et al. | | 277/544 |
| 7,963,525 B1 * | 6/2011 | Garrison | | 277/416 |

(Continued)

OTHER PUBLICATIONS

European Patent Office, International Search Report issued in counterpart PCT Application PCT/IB2012/000378. Date of Mailing: Jun. 20, 2012.

*Primary Examiner* — Vishal Patel
*Assistant Examiner* — Nicholas L Foster
(74) *Attorney, Agent, or Firm* — Dykema Gossett PLLC

(57) ABSTRACT

A segment of a seal assembly for sealing against a rotating member is disclosed. The segment includes a radial external surface, a radial internal surface for sealing against said rotating member, a face groove, and a secondary sealing surface. In embodiments, the segment may include a radial feed groove, and the face groove has an axial depth from the surface of the secondary sealing surface that is greater than the axial depth of the radial feed groove. Additionally, in embodiments, the face groove may include a relief groove, the face groove has a radial length at the axial position of the secondary sealing surface, the relief groove is axially offset from the secondary sealing surface, and the relief groove includes a portion with a radial length greater than the radial length of the face groove at the axial position of the secondary sealing surface.

24 Claims, 7 Drawing Sheets

(56) References Cited

U.S. PATENT DOCUMENTS

| | | | |
|---|---|---|---|
| 8,074,995 B2 * | 12/2011 | Vasagar et al. | 277/301 |
| 8,091,897 B2 * | 1/2012 | Giard | 277/370 |
| 8,091,898 B2 * | 1/2012 | Garrison | 277/399 |
| 8,342,534 B2 * | 1/2013 | Vasagar et al. | 277/399 |
| 8,356,819 B2 * | 1/2013 | Vasagar et al. | 277/399 |
| 8,408,554 B2 * | 4/2013 | Vasagar et al. | 277/301 |
| 8,408,556 B2 * | 4/2013 | Vasagar et al. | 277/399 |
| 2002/0014743 A1 * | 2/2002 | Zheng | 277/358 |
| 2003/0071422 A1 * | 4/2003 | Holder | 277/348 |
| 2009/0206554 A1 * | 8/2009 | Bowen et al. | 277/416 |
| 2010/0164183 A1 * | 7/2010 | Berard et al. | 277/544 |

* cited by examiner

SEGMENTED SEAL WITH AXIAL LOAD CONTROL FEATURE

TECHNICAL FIELD

The present disclosure relates to segmented radial seal segments and assemblies.

BACKGROUND

Segmented radial or circumferential seals have been employed in a number of environments associated with compressible fluids, such as gases. They have been used, for example, in connection with gas turbine engines. Such radial seals typically act to, among other things, seal high pressure areas from low pressure areas.

Conventional segmented seals commonly utilize a shallow face groove to control axial loading on the segmented seal. However, the radial position of the shallow face groove is limited due to the run-out of the shaft and the ability of the secondary seal to maintain contact with the sealing surface of the housing. Axial loading of segments is commonly required to maintain an adequate secondary seal contact between the secondary surface of the segment and a mating sealing surface. As axial loading on the segment increases, the ability of the segment to track shaft run out or respond to transient excursions of the shaft is negatively affected. In a number of applications the shallow face groove seal is positioned as low radially as possible to minimize pressure effects, therefore minimizing the axial loading on the segments but decreasing the secondary seal surface area.

Among other things, it is desirable to provide a segmented seal in which the radial location that the system pressure can act on, and can even be adjusted, to reduce the axial loading that the system pressure may apply to the segment without compromising the secondary seal surface area.

SUMMARY

A segment of a seal assembly for sealing against a rotating member is disclosed. In an embodiment, the segment includes a radial external surface, a radial internal surface for sealing against said rotating member, a face groove, a secondary sealing surface; and a radial feed groove. In associated embodiments, the face groove has an axial depth from the surface of the secondary sealing surface that is greater than the axial depth of the radial feed groove.

In another embodiment, a segment of a seal assembly includes a radial external surface, a radial internal surface for sealing against said rotating member, a face groove including a relief groove; and a secondary sealing surface. In associated embodiments, the face groove has an axial depth from the surface of the secondary sealing surface, the face groove has a radial length at the axial position of the secondary sealing surface, the relief groove is axially offset from the secondary sealing surface, and the relief groove includes a portion with a radial length greater than the radial length of the face groove at the axial position of the secondary sealing surface.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
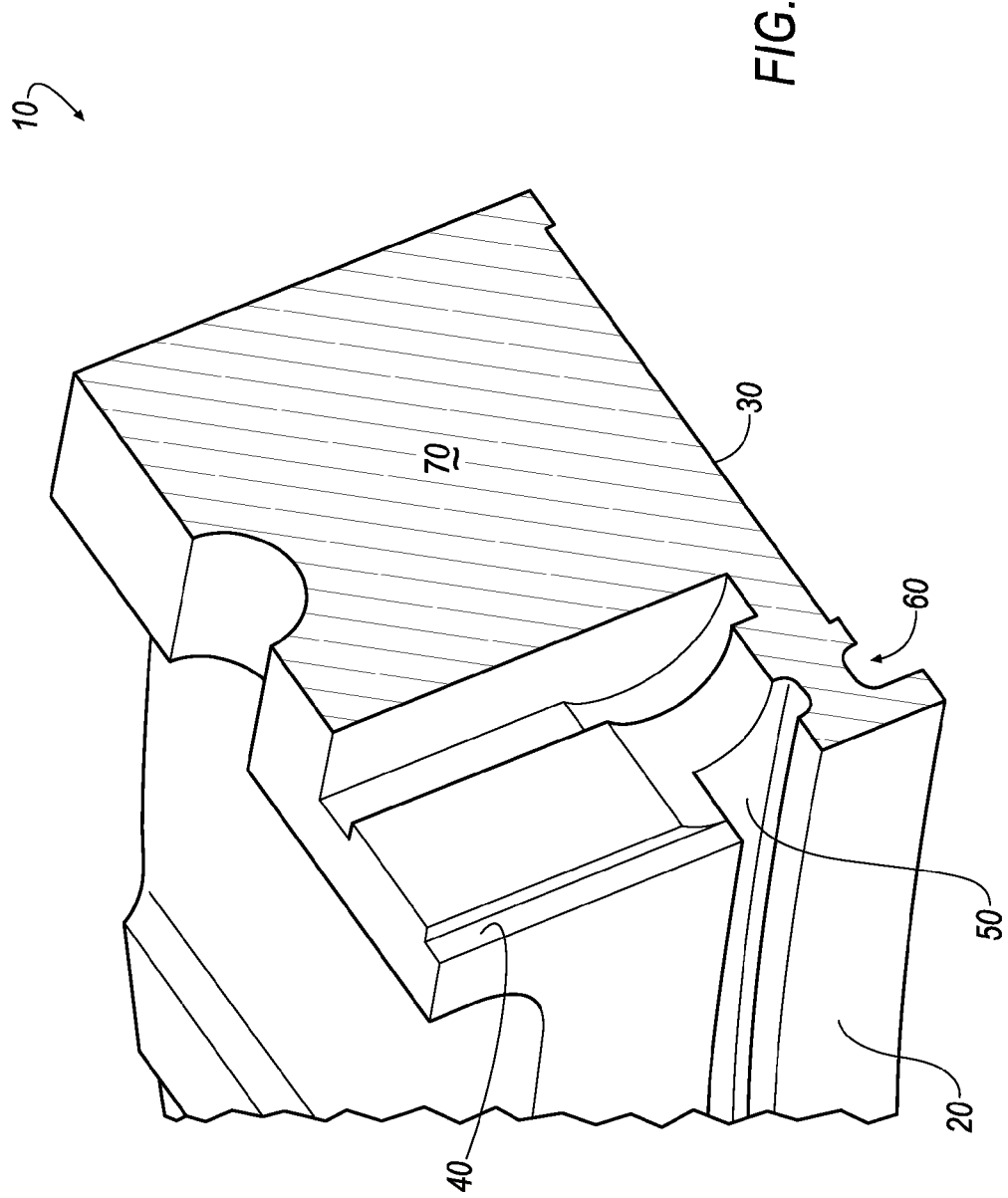
FIG. 1 is an enlarged isometric view of a cross-section of an embodiment of a seal ring segment viewed along line 1-1 in FIG. 2.

An enlarged isometric view of a cross section of a portion 10 of an embodiment of a seal ring segment that illustrates aspects of the disclosed concept is generally shown in FIG. 1. The illustrated portion 10 includes a secondary sealing surface 20, a seal bore 30, a radial feed groove 40, a face groove 50, a radial seal dam relief groove 60, and a segment cross sectional surface 70. As discussed further hereinafter, the disclosed face groove 50 may include one or more unique aspects and features. In an embodiment, the axial depth of the radial feed groove 40 may be about 0.120±0.005 inches. Moreover, embodiments of seal ring segments may include a plurality of radial feed grooves as desired or necessary to ensure/maintain a desired flow of fluid/air.

Figure 2:
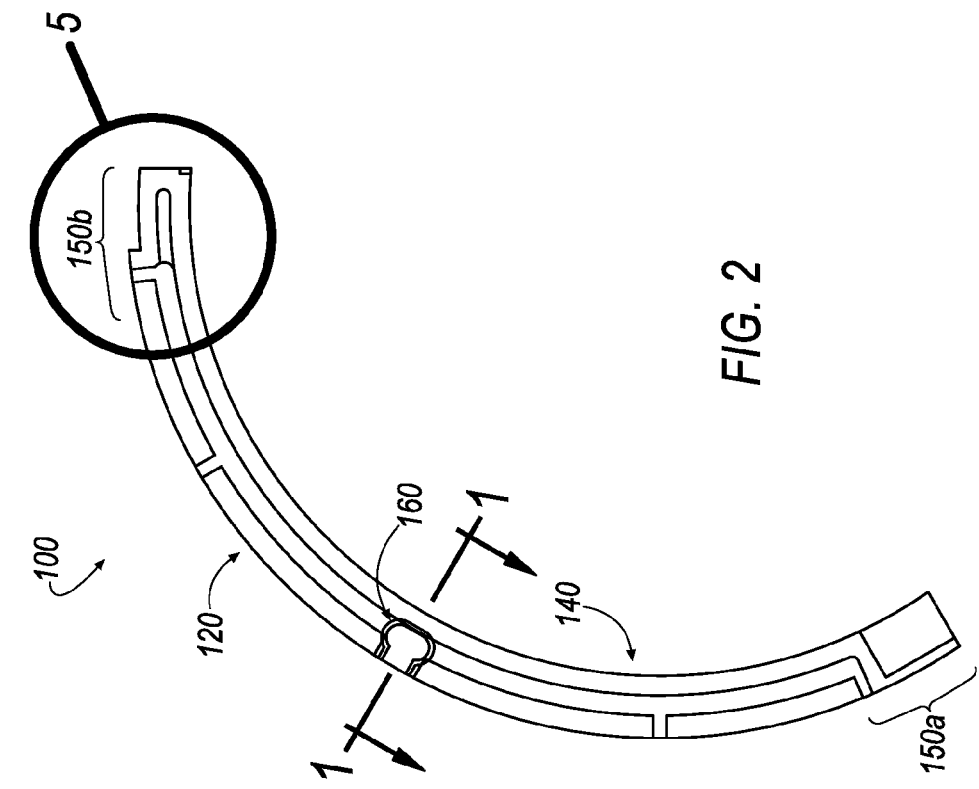
FIG. 2 is a view of a low pressure side of an embodiment of a seal ring segment.
Figure 2A:
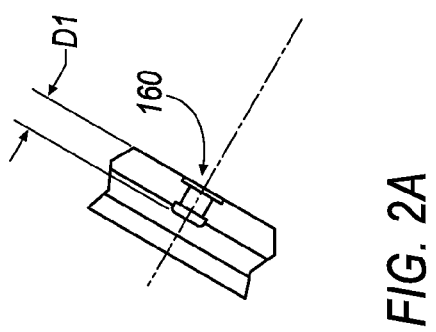
FIG. 2A is a side view of a portion of the seal ring segment shown in FIG. 2, generally illustrating a radial feed groove.
Figure 3:
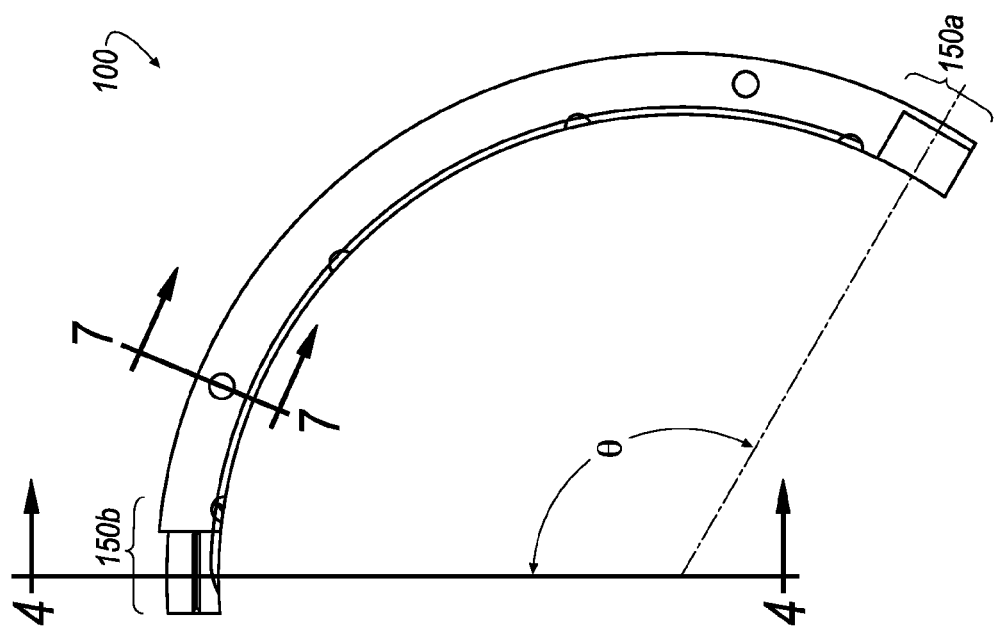
FIG. 3 is a view of a high pressure side of an embodiment of a seal ring segment.

FIGS. 2 and 3 illustrate views of a low pressure side and a high pressure side, respectively, of a seal ring segment 100 according to an embodiment of the disclosed concept. As generally illustrated in FIG. 2, the seal ring segment 100 includes a radial external surface 120, and a radial internal surface 140 corresponding to a bore side of the segment. The seal ring segment 100 may additionally include at least one transition portion to serve to interface with and/or overlap with an adjacent segment. In FIG. 2, examples of first and second transition portions 150a, 150b are shown at each end of the segment 100. The seal ring segment 100 may further include a radial feed/anti-rotation groove 160 (also illustrated in the side view of that portion shown in FIG. 2A), which may be in fluid communication with an associated face groove. It is noted that a blade pin (or "key") may be fit within into a slot associated with depicted groove 160. As generally illustrated in FIG. 2A, the radial feed/anti-rotation groove 160 may have a depth $D_1$. For example and without limitation, in an embodiment the depicted depth $D_1$ of the radial feed/anti-rotation groove 160 may have a depth of 0.110±0.005 inches. In embodiments, it is noted that a significant portion of the flow of fluid/air may be associated with the radial feed/anti-rotation groove 160, the flow of which may be in direct communication with face groove 50. Seal ring segments associated with embodiments of the invention can be configured to address such a significant portion of flow, and the associated face groove can be configured to effectively provide a "reservoir" of fluid/air that can help prevent a choke in system/assembly flow.

Figure 4:
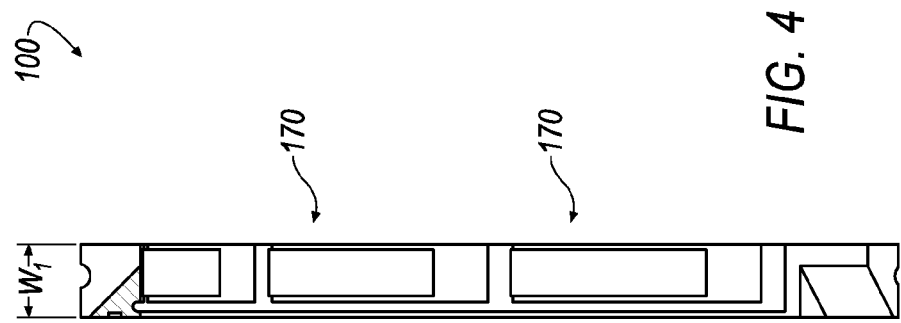
FIG. 4 is a view of the bore region of an embodiment of a seal ring segment viewed looking from an inner diameter (ID) to an outer diameter (OD)

FIG. 4 depicts the bore region of a seal ring segment 100 of the type shown in FIGS. 2 and 3, including one or more lift augmentation formations (also referred to as "pads") 170 on the internal (or bore-side) surface 140 of seal ring segment 100. The present invention is not limited to the disclosed form of pads 170, and one or more pads included on the bore-side may, for example, comprise various types steps or pads, including Rayleigh steps or pads, and pads with improved dynamic features. Examples of a radial seal segment having improved hydrodynamic features are disclosed in U.S. Pat. No. 7,770,895 and U.S. Patent Application Publication No. 2010/0164183, the substance of which are incorporated by reference as if fully set forth herein. Further, in an embodiment and without limitation, the seal ring segment may generally have an overall width, depicted in FIG. 4 as width $W_1$, of 0.230±0.002 inches. It is noted that each seal ring segment may cover a portion or angular segment of 360° degrees, which is commonly needed to provide a seal about a round or circular rotating member. In the embodiment illustrated in FIG. 3, the illustrated angle θ is approximately 120°. When a plurality of similar segments are involved, the angular range covered by each segment will typically be a subset of 360°, such as 72°, 90°, 120°, or 180°. Moreover, as generally indicated in FIG. 3 (i.e., the portion not included with θ), there may be a portion of each end of the segment that is intended to overlap or interconnect with an adjacent segment.

Figure 6:
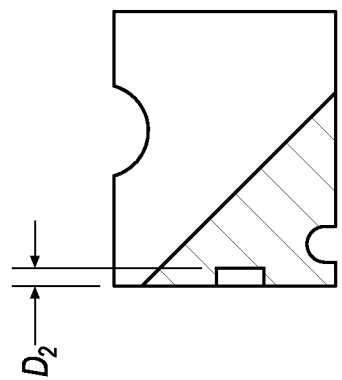
FIG. 6 is a cross sectional view of the end portion of the seal ring segment shown in FIG. 5.
Figure 5:
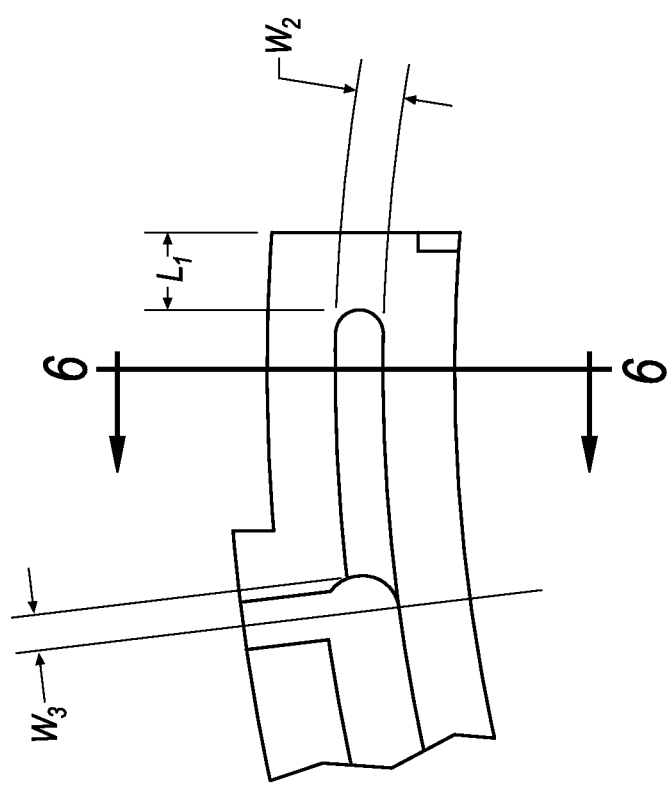
FIG. 5 is an enlarged view of the end portion of the embodiment of a seal ring segment shown in FIG. 2.

FIG. 5 is an enlarged view of the end portion of the embodiment of a seal ring segment 100 shown in FIG. 2. FIG. 6 is a cross sectional view of the end portion of the seal ring segment shown in FIG. 5 viewed along section line 6-6. With further reference to FIGS. 5 and 6, and by way of example and without limitation, in an embodiment of the invention the segment 100 may be provided with the following illustrated dimensions: $W_2$ of 0.040±0.005 inches; $W_3$ of 0.030±0.005 inches; $L_1$ of 0.065±0.005 inches; and $D_2$ of 0.015±0.005 inches.

Figure 7:
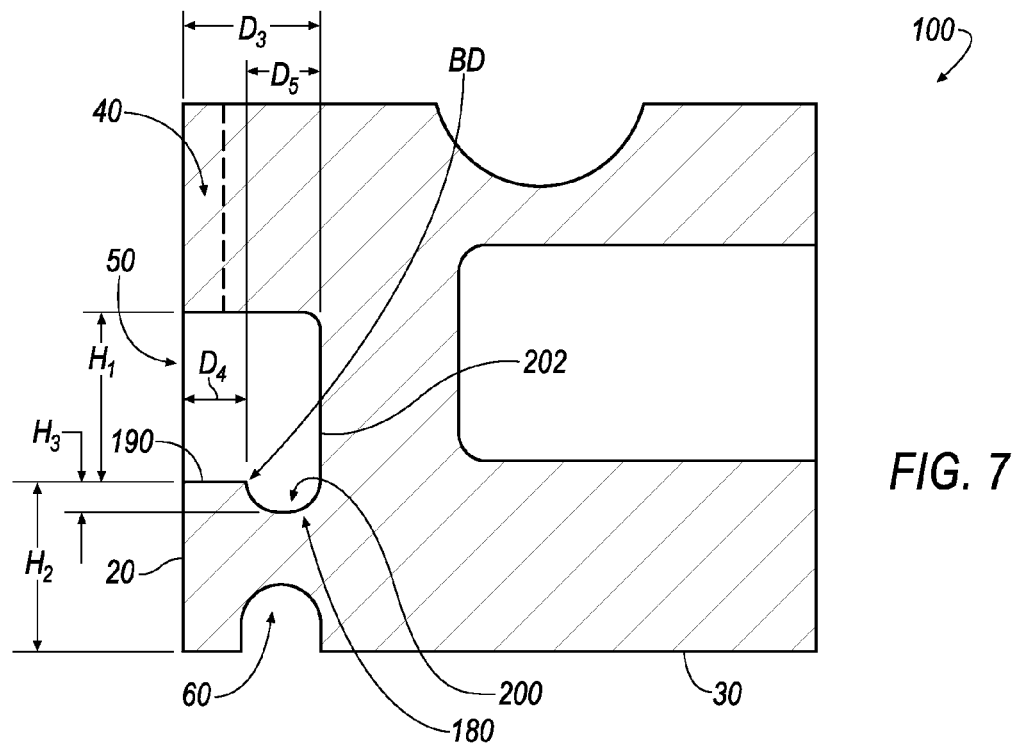
FIG. 7 is a cross sectional view of the embodiment of the seal ring segment shown in FIG. 3.

Turning to FIG. 7, an embodiment of a cross section of a seal ring segment—viewed along section line 7-7 shown in FIG. 3—is generally shown. The illustrated portion of the seal ring segment 100 includes a secondary sealing surface 20, a seal bore 30, a radial feed groove 40 (identified in connection with the broken lines), a face groove 50, and a radial seal dam relief groove 60. FIG. 7 additionally illustrates several aspects/features that may be associated with a face groove 50 in accordance with teachings of the present disclosure. As generally depicted, the face groove 50 may have an overall axial depth $D_3$ extending in the axial direction from the surface of the secondary sealing surface 20. It is noted that with conventional seal ring segments, the depth of the associated face groove is typically comparatively shallow, for example, about 0.015 inches deep, and is more in the nature of the same axial depth as that associated with the radial feed groove 40. With embodiments of the present disclosure, the overall axial depth $D_3$ is greater than the axial depth of the radial feed groove 40. Moreover, with for some embodiments, the overall axial depth $D_3$ may be at least twice the axial depth of the associated radial feed groove 40 and, for some embodiments, the overall axial depth $D_3$ may be at least three times the axial depth of the radial feed groove 40. In some embodiments, the overall axial depth $D_3$ may be about 0.025 inches or more. Further, and without limitation, in an embodiment, the overall axial depth $D_3$ may be about 0.050±0.003 inches. In embodiments, the radial feed groove and radial/anti-rotation groove can be configured to provide increased (and more than sufficient) communication of fluid/air between the operating source pressure and the outside pressure in the event of leakage past the secondary seal. Having a large axial feed groove volume (i.e., via face groove 50) can provide fluid accumulation to help ensure sufficient operating source pressure in the event of transient conditions.

Without limitation, as generally illustrated in FIG. 7, face groove 50 may include an entry portion 190 having an entry axial depth $D_4$ that extends in the axial direction from the surface of the secondary sealing surface 20. In the illustrated cross section, the entry portion 190 may have a height $H_1$, which may if desired by substantially constant for some or all of the axial depth of the entry portion 190. If desired the lowermost radial boundary (nearer the seal bore 30) may be substantially straight over its axial length. By way of example, and without limitation, in an embodiment the entry axial depth $D_4$ may be about 0.023±0.008 inches, while the height $H_1$ of the entry portion 190 may be about 0.062±0.004 inches.

Also, as generally illustrated in FIG. 7, the face groove 50 may include a secondary portion or relief groove 180. A theoretical balance diameter of the segment for axial loading is generally designated BD. As shown in the illustrated embodiment, the relief groove 180 may axially offset from the secondary sealing surface 40, and may extend an additional distance $D_5$ beyond that of the entry axial depth $D_4$. In embodiments, such as illustrated, the relief groove 180 may include an undercut portion 200. In other embodiments, the entry portion 190 may generally continue axially across (at the same level or slightly below) to the axial extent of the face groove (generally identified as 202). With reference to the illustrated height $H_2$ of the sealing surface 40, the relief groove 180 may have an undercut or reduced height $H_3$ with respect to the sealing surface 40 and/or the lowermost radial boundary (nearer the seal bore 30) of the entry portion 190. If desired, whether for manufacturing reasons to create the additional depth or otherwise, the lower boundary of the relief groove 180 may have curved shape, for example, as generally illustrated. By way of example, and without limitation, in embodiments, $D_5$ may be about 0.027±0.005 inches, $H_2$ may be about 0.060±0.003 inches, and $H_3$ may range from about 0.0100 inches to about 0.0140 inches.

Figure 8:
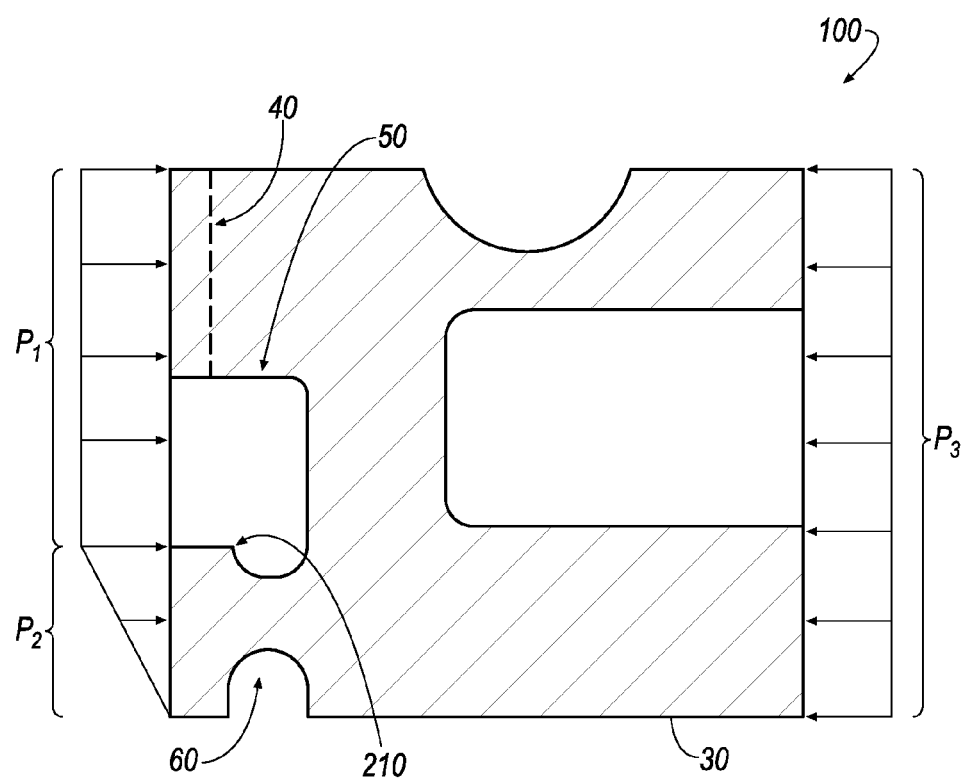
FIG. 8 is a cross sectional view of the embodiment of a seal ring segment shown in FIG. 7, generally illustrating system axial pressure distribution applied to portions of the segment.
Figure 9:
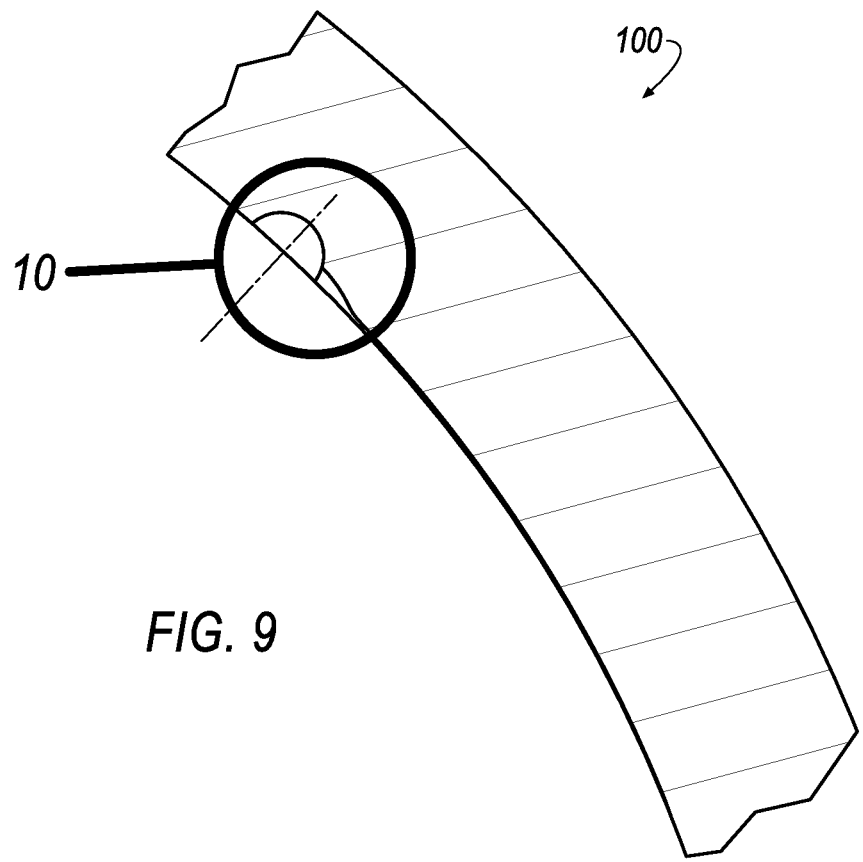
FIG. 9 is a partial sectional view of an embodiment of a seal ring segment including a hydrodynamic feature.
Figure 10:
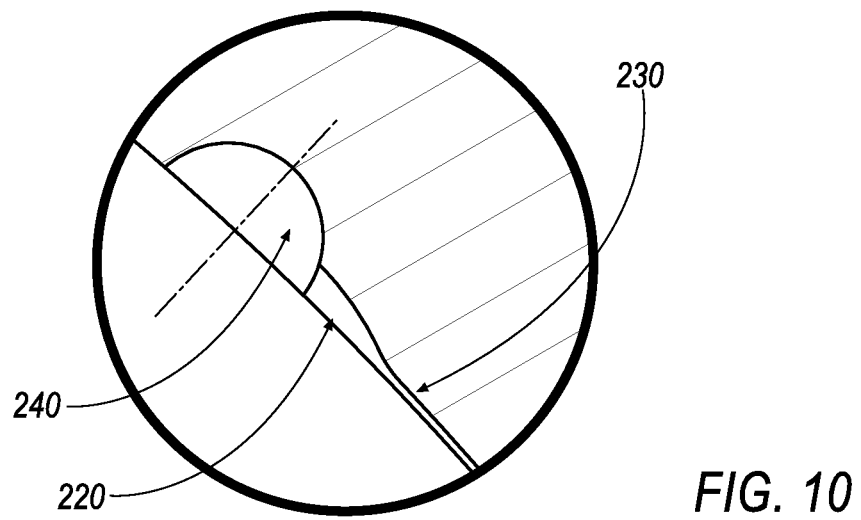
FIG. 10 is an enlarged view of a portion of the partial sectional view of the seal ring segment shown in FIG. 9.

FIG. 8 is a cross sectional view of the embodiment of a seal ring segment shown in FIG. 7, which generally illustrates the application of system pressures applied to two sides of the seal ring segment 100. On a first side, $P_1$ generally represents system pressure applied to the secondary seal side of seal ring segment 100 up to the balance diameter (the theoretical balance diameter of the segment for axial loading is generally designated 210), and $P_2$ generally represents the unbalanced area where a pressure drop occurs from system pressure to ambient. On the opposing side of the seal ring segment 100, $P_3$ generally represents system pressure applied to the back of the seal ring segment. It is noted that seal bore 30 may be of various standard configurations, or may include one or more hydrodynamic features. FIGS. 9 and 10 illustrate an example of a hydrodynamic feature that may be used in connection with a seal ring segment. In the illustrated embodiment, a scooping groove 220 may be provided between a ramped portion 230 and a transverse groove 240. However, the disclosed concept is not limited to the illustrated configurations, and other variations—including hydrodynamic feature configurations—known to those of skill in the art may be utilized.

Figure 11:
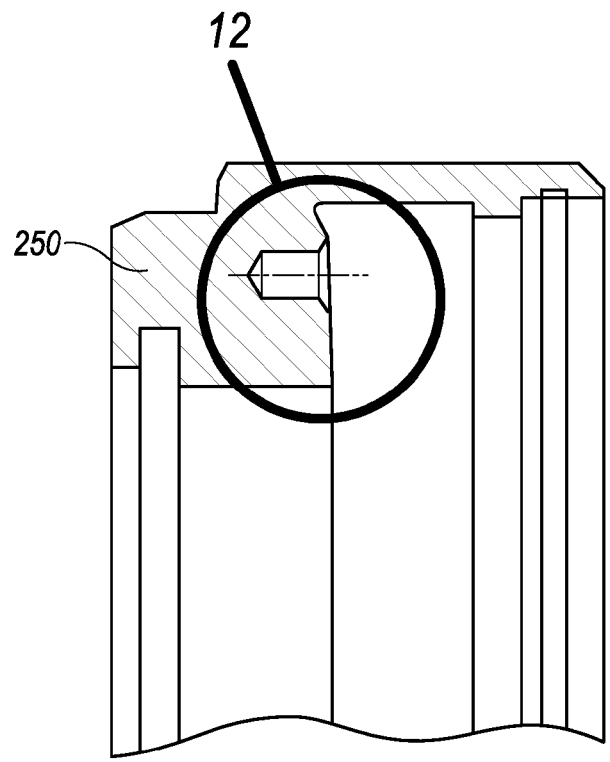
FIG. 11 is a partial sectional view of an embodiment of a mating housing for a segmented ring.

An example of a mating housing 250 for a segmented seal ring is generally illustrated in FIG. 11. An enlarged view of a portion of the mating housing 250 is shown in FIG. 11. As generally illustrated, the mating housing 250 may include an aperture, as generally illustrated (which can be configured to accept a pin or key associated with the seal ring segment), and a mating portion 260 that is intended to mate with a secondary sealing surface of a seal ring segment. In embodiments, a portion of the mating portion 260 may include a taper. For example, and without limitation, in an embodiment, the dimension of the taper T may be 0.0002+0.0002 inches.

Figure 12:
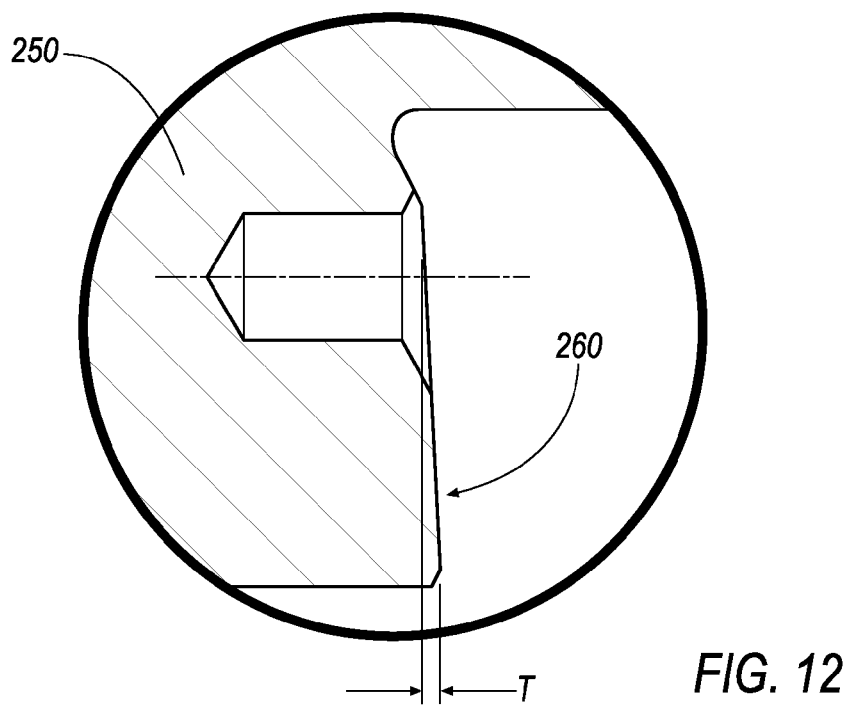
FIG. 12 is an enlarged view of a portion of the view shown in FIG. 11.

Standard design practice for segmented seals commonly assumes that system pressure is maintained in the face groove during operation. The force diagram included in FIG. 8 generally depicts the pressures/forces acting on the seal ring segment in the axial direction. Because the sealing surface on the housing (see, e.g., mating portion 260 on FIG. 12) may not (and generally cannot) be perfectly flat—and may in fact be intentionally tapered radially—a minute leak path may occur across the secondary sealing surface. With conventional seal ring segments—which comparatively have a shallow face groove—there can be insufficient volume to keep up with the flow rate across the secondary sealing surface. As such, the pressure in a shallow groove may fall below that of the system pressure. If that occurs, the balance diameter would shift radially outward toward the outer diameter of the seal ring segment. As a result of the balance diameter shifting radially outward, the resulting axial load would also increase. The higher the system pressure, the more likely the balance diameter would increase as the flow across the secondary sealing surface increases, since the volume would be limited with a comparatively more shallow face groove. By providing a deeper face groove in connection with the present disclosure, the volume may be increased, and thus may provide a greater temperature reduction of the seal operating temperature, even at high system pressures. That is a deeper face groove, such as taught in embodiments of the present disclosure, may allow for a much larger flow volume—which can therefore more amply supply available fluid to better maintain system pressure at the theoretical balance diameter (BD). It is noted that with embodiments of the present disclosure, the volume of the face groove may be ten times (or more) the volume of conventional (comparatively more shallow) face grooves.

The following equation may be associated with the axial loading (L) due to system pressure:

$$L = (((BD^2 - \text{seal bore}^2) \times \pi)/4) \times \text{system pressure} \times \text{pressure profile}$$

Therefore, as the balance diameter of the seal ring segment approaches the seal bore, the axial loading that is applied to the secondary sealing surface decreases. The reduction in axial loading reduces the radial force required for the segment to move radially. Such a reduction in radial force can, for example, improve the tracking ability for standard and arch-bound segmented seals. In the case of seal ring segments with hydrodynamic features, such a reduction in radial force can increase the predicted hydrodynamic air film by as much as 50% or more for a given hydrodynamic pad geometry on the seal bore (e.g., when used with seals operating at high pressure conditions). As such, the addition of hydrodynamic features to the aforementioned face groove teachings can provide a segment that functions comparatively cooler operating seal temperatures and may therefore expand the operational life of the seal.

Some exemplary dimensions have been provided in this disclosure. However, many dimensions may be dictated by a specific application and various manufacturers. As such, the foregoing descriptions of specific embodiments of the present invention have been presented for purposes of illustration and description. They are not intended to be exhaustive or to limit the invention to the precise forms disclosed, and various modifications and variations are possible in light of the above teachings. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A segment of a seal assembly for sealing against a rotating member, the segment comprising:
    a radial external surface;
    a radial internal surface for sealing against said rotating member;
    a circumferential face groove which runs along substantially all of the segment of the seal assembly;
    a secondary sealing surface; and
    a radial feed groove;
    wherein the face groove has an axial depth from the surface of the secondary sealing surface that is greater than an axial depth of the radial feed groove;
    wherein the face groove includes a circumferential first portion disposed at the axial position of the secondary sealing surface; the face groove includes a circumferential second portion axially offset from the secondary sealing surface and axially inward of the first portion; the first and second portions are disposed along the entire face groove; the second portion does not include the first portion; and the second portion includes a maximum radial length of the face groove that is greater than a maximum radial length of the first portion of the face groove.

2. The segment of claim 1, wherein the axial depth of the face groove is at least double the axial depth of the radial feed groove.

3. The segment of claim 1, wherein the axial depth of the face groove is at least three times the axial depth of the radial feed groove.

4. The segment of claim 1, wherein the axial depth of the face groove is at least about 0.025 inches.

5. The segment of claim 1, wherein the axial depth of the face groove is at least about 0.047 inches.

6. The segment of claim 1, wherein the second portion comprises an undercut portion.

7. The segment of claim 1, wherein the radial length of a portion of the face groove is at least about 0.010 inches longer in the radial direction than the radial length of the face groove at the axial position of the secondary sealing surface.

8. The segment of claim 1, wherein the first portion of the face groove is an entry portion, and wherein the second portion of the face groove is a relief groove.

9. The segment of claim 8, wherein the relief groove is axially offset from the secondary sealing surface by an axial distance of at least about 0.020 inches.

10. The segment of claim 1, wherein the radial internal surface includes a hydrodynamic feature.

11. The segment of claim 10, wherein the hydrodynamic feature comprises one or more lift-off pads.

12. A segment of a seal assembly for sealing against a rotating member, the segment comprising:
- a radial external surface;
- a radial internal surface for sealing against said rotating member;
- a circumferential face groove including a circumferential relief groove; and
- a secondary sealing surface;
- wherein the face groove runs substantially along all of the segment of the seal assembly, and the relief groove runs along the entire face groove;
- wherein the face groove has an axial depth from the surface of the secondary sealing surface to an axial bottom surface of the face groove; the face groove has a radial length at the axial position of the secondary sealing surface; the relief groove is completely axially offset from the secondary sealing surface; and the relief groove includes a portion axially inward from the secondary sealing surface, the portion including a maximum radial length that is greater than the radial length of the face groove at the axial position of the secondary sealing surface.

13. The segment of claim 12, including a radial feed groove.

14. The segment of claim 13, wherein the axial depth of the face groove is greater than the axial depth of the radial feed groove.

15. The segment of claim 13, wherein the axial depth of the face groove is at least double the axial depth of the radial feed groove.

16. The segment of claim 13, wherein the axial depth of the face groove is at least three times the axial depth of the radial feed groove.

17. The segment of claim 12, wherein the axial depth of the face groove is at least about 0.025 inches.

18. The segment of claim 12, wherein the axial depth of the face groove is at least about 0.047 inches.

19. The segment of claim 12, wherein the axial depth of the face groove is about 0.050±0.003 inches.

20. The segment of claim 12, wherein the axial depth of the relief groove is about 0.027±0.005 inches.

21. The segment of claim 12, wherein the radial length of the portion of the relief groove is at least about 0.0100 inches longer in the radial direction than the radial length of the face groove at the axial position of the secondary sealing surface.

22. The segment of claim 12, wherein the relief groove is axially offset from the secondary sealing surface by an axial distance of at least about 0.020 inches.

23. The segment of claim 12, wherein the radial internal surface includes a hydrodynamic feature.

24. The segment of claim 23, wherein the hydrodynamic feature comprises lift-off pads.

* * * * *